United States Patent Office 2,738,356
Patented Mar. 13, 1956

2,738,356
NORTRICYCLYL ESTERS

Samuel B. Soloway and Rex E. Lidov, Denver, Colo., Henry Bluestone, Shaker Heights, Ohio, and Julius Hyman, Tallahassee, Fla., assignors to Shell Development Company, New York, N. Y., a corporation of Delaware No Drawing. Application November 12, 1954,
Serial No. 468,551

9 Claims. (Cl. 260—410)

This invention relates to a group of novel chemical compounds consisting of derivatives of tricyclo-(2.2.1.0$^{2,6}$)-heptane, or nortricyclene. More particularly, the invention pertains to new and useful ester derivatives of tricyclo-(2.2.1.0$^{2,6}$)-heptane, or nortricyclyl esters.

The new chemical compounds provided by this invention are those having the structure represented by the planar formula:

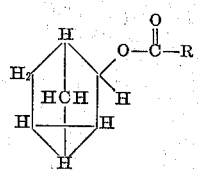

in which the grouping

represents the acyloxy radical

of a carboxylic acid

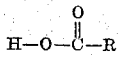

The new chemical compounds of this invention include the 3-nortricyclyl esters of the fatty acids, such as of formic acid and also of the higher unsubstituted aliphatic acids, having two or more carbon atoms in the molecule, such as 3-nortricyclyl acetate, 3-nortricyclyl butyrate, 3-nortricyclyl octanoate, 3-nortricyclyl laurate, 3-nortricyclyl stearate and 3-nortricyclyl palmitate. In addition to the saturated, preferably unsubstituted aliphatic esters, the invention includes the 3-nortricyclyl esters of the unsaturated aliphatic acids, such as 3-nortricyclyl crotonate, 3-nortricyclyl acrylate, 3-nortricyclyl methacrylate, 3-nortricyclyl alpha-chloroacrylate, 3-nortricyclyl octenoate, 3-nortricyclyl oleate and 3-notricyclyl elaidate. The aromatic 3-nortricyclyl esters, which are included by the invention, are exemplified by 3-nortricyclyl benzoate, 3-nortricyclyl cinnamate, 3-nortricyclyl 2,5-dinitro benzoate, 3-nortricyclyl 2,4,5-trichlorobenzoate, 3-nortricyclyl naphthoate and 3-nortricyclyl phenacetate. Alicyclic 3-nortricyclyl esters that are included by the invention are illustrated by 3-nortricyclyl cyclohexanecarboxylate, 3-nortricyclyl cyclopentanecarboxylate, and 3-nortricyclyl 3-nortricyclenecarboxylate. In the novel esters of the invention the group R of the foregoing formula thus may be aliphatic, aromatic, alicyclic or heterocyclic and it may be saturated or unsaturated. In the preferred esters the group R contains an unsaturated carbon-to-carbon linkage which preferably is an unsaturated linkage of the aromatic type, as in the 3-nortricyclyl esters of the aromatic carboxylic acids. In the preferred esters the carboxylic acid moiety is the residue of a carboxylic acid containing from 3 to about 20 carbon atoms.

In general, the compounds of this invention may be produced by reaction between the appropriate carboxylic acid and bicyclo-(2.2.1)-2,5-heptadiene, with or without a catalyst such as sulfuric acid, boron trifluoride or the like. Thus, the compound 3-nortricyclyl formate may be prepared by the reaction between bicyclo-(2.2.1)-2,5-heptadiene and formic acid, as follows:

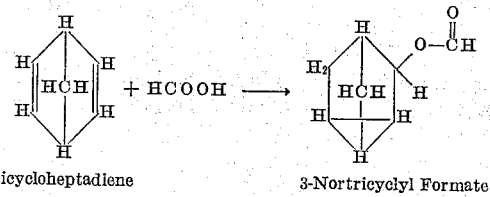

Bicycloheptadiene      3-Nortricyclyl Formate

The compound 3-nortricyclyl benzoate has been made by the reaction between bicycloheptadiene and benzoic acid in the presence of sulfuric acid, as follows:

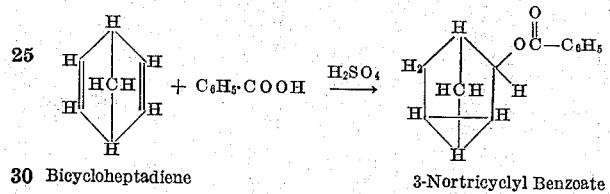

Bicycloheptadiene      3-Nortricyclyl Benzoate

In the following examples, suitable methods of making several compounds of this invention are shown, but it will be understood that other methods of making these compounds may exist.

EXAMPLE 1

(*Preparation of nortricyclyl formate*)

Formic acid (1 mole) and bicycloheptadiene were mixed without evolution of heat and the two phase system was heated on the steam bath for 18 hours. At the end of this time, only a single phase was discernible and the material was distilled. The product was a colorless oil having a boiling point of 74–8° C./37 mm.; n 25.5/D 1.4731.

Analysis for $C_8H_{10}O_2$: Calculated—C, 69.5%; H, 7.2%. Found—C, 69.4%; H, 7.2%.

Infrared spectroscopic analysis indicated the presence of the nortricyclyl compound, and catalytic hydrogenation indicated its presence to the extent of 68%.

EXAMPLE 2

(*Preparation of nortricyclyl stearate*)

Stearic acid (1 mole) and bicycloheptadiene (1.25 moles) were mixed and 6.0 ml. of concentrated sulfuric acid then carefully added. The mixture turned dark and was heated on the steam bath, under reflux, for 18 hours. The heavy oil was taken up in ether and washed with water. The solvent was removed, after separating and drying the organic layer. The heavy residual oil was taken up in hexane, concentrated and stored in the refrigerator overnight. The solid material which separated was filtered off. Distillation of the filtrate, after removal of solvent, yielded an oil slightly tinged with yellow, having a boiling point of 180–93° C./0.1 mm.

Analysis for $C_{25}H_{44}O_2$: Calculated—C, 79.8% H, 11.7%. Found—C, 79.1%; H, 11.5%.

Infrared spectroscopic analysis indicated the presence of the nortricyclyl compound.

EXAMPLE 3

*(Preparation of nortricyclyl cinnamate)*

A mixture consisting of 29.6 grams (0.2 mole) of transcinnamic acid, 36.8 grams (0.4 mole) of bicycloheptadiene, 200 ml. of benzene, and 10 grams of boron trifluoride-ethyl ether complex, was heated under gentle reflux for one hour with constant stirring. The product was cooled, and the benzene solution worked with water, then with soda solution, and finally with water. The product was distilled under reduced pressure, and identified as a colorless oil having a boiling point of 136–139° C./0.2 mm., was obtained. The yield was 37 grams (77%).

Analysis for $C_{16}H_{16}O_2$: Calculated—C, 80.0%; H, 6.67%. Found—C, 79.5%; H, 6.71%.

Infrared spectroscopic analysis indicated that the product thus obtained was in substantial part a nortricyclyl ester, determined by catalytic hydrogenation to be 40% of the product.

EXAMPLE 4

*(Preparation of nortricyclyl crotonate)*

A mixture of 17.2 grams (0.2 mole) of crotonic acid, 36.8 grams (0.4 mole) of bicycloheptadiene, and one drop of boron trifluoridediethyl ether complex was heated under reflux at 102–121° C. for 1½ hours with constant stirring. The product was cooled, washed with water, with soda solution, and finally with water, then dried and distilled under reduced pressure. The material, identified as 90% nortricyclyl crotonate was distilled over as a colorless oil at 74.5–77° C./ 1.1 mm., yield 20.2 grams (57%). n 24/D 1.4932; neutral equivalent, zero.

Analysis for $C_{11}H_{14}O_2$: Calculated—C, 79.2%; H, 7.9%. Found—C, 74.0%; H, 8.2%.

Infrared spectroscopic analysis indicated the presence of the nortricyclyl compound; and catalytic hydrogenation indicated its presence to the extent of 90%.

EXAMPLE 5

*(Preparation of nortricyclyl oleate)*

A mixture of 141 grams (0.5 mole) of oleic acid, 46 grams (0.5 mole) of bicycloheptadiene, and 10 grams of boron trifluoridediethyl ether complex was stirred at 55° C. for 5½ hours. The mixture was cooled, washed with water, taken up in benzene and the benzene solution washed successively with dilute soda solution and water. The benzene was removed by distillation at reduced pressure, leaving a residual oil which was fractionated in vacuo to yield 93.5 grams (50%) of a product identified as 90% nortricyclyl oleate, obtained as a pale yellow oil and having a boiling point of 200–215° C./1.8 mm.; n 23/D 1.4753–1.4761; neutral equivalent, zero.

Analysis for $C_{25}H_{42}O_2$: Calculated—C, 80.2%; H, 11.2%; molecular weight, 374. Found—C, 78.6%; H, 11.1%; molecular weight, 340.

Infrared spectroscopic analysis indicated the presence of the nortricyclyl structure; and from catalytic hydrogenation, it was concluded that the notricyclyl ester comprised approximately 90 percent of the product thus obtained.

Results similar to those described above were also obtained when 50 percent sulfuric acid was utilized as a catalyst.

EXAMPLE 6

*(Preparation of nortricyclyl benzoate)*

Benzoic acid (1 mole) and bicycloheptadiene (1.25 moles) were mixed and 5 ml. of concentrated sulfuric acid then carefully added. The mixture was heated in the steam bath, under reflux for 18 hours, then cooled and taken up in ether. The solution was washed with water and the organic layer was separated and dried. The solvent was evaporated and the residual oil distilled, yielding a colorless oil, having a boiling point of 114–117° C./0.1 mm., n 29.5/D 1.5421.

Analysis for $C_{14}H_{14}O_2$: Calculated—C, 78.5%; H, 6.6%; molecular weight, 214. Found—C, 78.0%; H, 6.6%; molecular weight, 222.

Infrared spectroscopic analysis indicated the presence of the nortricyclyl compound.

EXAMPLE 7

*(Preparation of nortricyclyl chloroacetate)*

Monochloracetic acid (1 mole) and bicycloheptadiene (1.5 moles) were mixed and heated on the steam bath, under reflux, for 22 hours. The heavy black crude product was distilled directly to yield a colorless oil, with a boiling point of 85–89° C./0.8 mm.; n 26/D 1.4911.

Analysis for $C_9H_{11}O_2Cl$: Calculated—C, 58.1%; H, 6.0%; Cl, 19.1%. Found—C, 57.0%; H, 5.6%; Cl, 19.5%.

Infrared spectroscopic analysis indicated the presence of the nortricyclyl compound.

EXAMPLE 8

*(Preparation of 3-nortricyclyl acetate)*

A mixture of 46 grams of bicyclohepetadiene and 120 grams of acetic acid was treated with 1 ml. of 40 percent sulfuric acid and then heated at 100° C. for a period of three hours. The product was isolated by pouring the reaction mixture into water, extracting with pentane and then distilling; 52 grams (68 percent of theory based on diene) of a colorless, mobile oil was obtained boiling at 74–76° C. (10 mm.).

The nortricyclene structure was identified by infrared spectroscopic analysis and catalytic hydrogenation indicated that the nortricyclyl compound constituted approximately 85 per cent of the material present.

EXAMPLE 9

*(Preparation of nortricyclyl 3,5-dinitrobenzoate)*

In a manner similar to that employed in Example 6, bicycloheptadiene and 3,5-dinitrobenzoate acid can be reacted to produce 3-nortricyclyl-3,5-dinitrobenzoate, melting point after purification, 116–117° C.

The novel compounds of this invention are useful in various arts. The low molecular weight fatty acid esters are useful as high boiling solvents, as in polishes and in compositions for softening leather. They also may be employed as components of lacquers, such as cellulose acetate and cellulose butyrate lacquers. The higher molecular weight fatty acid esters, especially the 3-nortricyclyl esters of fatty acids containg 6 or more carbon atoms, are of interest as plasticizers, for example for polyvinyl chloride and polyvinylidene chloride. The unsaturated fatty acid esters, especially the esters of the alpha-methylidene carboxylic acids, such acrylic acid, alpha-chloroacrylic acid and methacrylic acid and the higher alpha-alkyl acrylic acids, may be employed as polymer intermediates. Polymers useful in coating compositions and for the preparation of molding and casting compositions may be prepared by polymerizing these polymerizable monomers alone or together with other ethylenically unsaturated polymerizable compounds. The aromatic esters of the invention, with special reference to the substituted esters, such as the halogenoaryl esters and the nitroaryl esters, are of interest as biological chemicals and as intermediates for the preparation of biologically active chemicals, such as herbicides and insecticides.

It will be understood, of course, that when the novel esters of this invention are to be prepared by the reaction of a carboxylic acid with bicyclo-(2.2.1)-2,5-heptadiene, as is illustrated in the working examples, the amounts of reactants used and the time, temperature and other reaction conditions, may be varied from those that are shown in the examples. In addition, the novel compounds of this invention may be made in other ways than shown in the working examples. For example, there now are disclosed and claimed in the co-pending application of the same inventors, Serial No. 468,552, filed November 12, 1954, novel halogen derivatives of nortricyclene from which the presently claimed esters can be prepared by metathesis, or indirectly with intervening preparation of 3-nortricyclenol. A method of preparing the compounds of this invention is also disclosed and claimed in the co-pending application of Bluestone, Soloway, Hyman and Lidov, Serial No. 237,844, filed July 20, 1951, now U. S. Patent 2,730,548, entitled "Method for Producing Polycyclic Hydrocarbons and Derivatives Thereof," the disclosures of which are hereby incorporated by reference.

This application is a continuation-in-part of our co-pending application Serial No. 237,846, filed July 20, 1951, now abandoned.

We claim as our invention:
1. The 3-nortricyclyl ester of an unsubstituted aliphatic carboxylic acid.
2. The 3-nortricyclyl ester of a halogen-substituted aliphatic carboxylic acid.
3. The 3-nortricyclyl ester of a saturated aliphatic carboxylic acid.
4. The 3-nortricyclyl ester of an olefinically unsaturated carboxylic acid.
5. The 3-nortricyclyl ester of an alpha-methylidene carboxylic acid.
6. 3-nortricyclyl formate.
7. 3-nortricyclyl stearate.
8. 3-nortricyclyl crotonate.
9. 3-nortricyclyl chloroacetate.

No References Cited